(12) United States Patent
Miller et al.

(10) Patent No.: US 10,858,068 B1
(45) Date of Patent: *Dec. 8, 2020

(54) DEVICES AND METHODS FOR WAKE TUNING

(71) Applicant: Correct Craft IP Holdings, LLC, Orlando, FL (US)

(72) Inventors: Eric J. Miller, Orlando, FL (US); William F. Waits, Jr., Orlando, FL (US)

(73) Assignee: Correct Craft IP Holdings, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,797

(22) Filed: Apr. 23, 2019

Related U.S. Application Data

(63) Continuation of application No. 15/727,660, filed on Oct. 9, 2017, now Pat. No. 10,308,321.

(60) Provisional application No. 62/481,826, filed on Apr. 5, 2017.

(51) Int. Cl.
*B63B 1/32* (2006.01)
*B63B 32/70* (2020.01)
*B63B 34/70* (2020.01)

(52) U.S. Cl.
CPC .............. *B63B 1/32* (2013.01); *B63B 32/70* (2020.02); *B63B 34/70* (2020.02)

(58) Field of Classification Search
CPC ......... B63B 39/061; B63B 1/32; B63B 39/00; B63B 3/38
USPC ......................................................... 114/67 R
See application file for complete search history.

(56) References Cited

U.S. PATENT DOCUMENTS

| | | | |
|---|---|---|---|
| 4,909,175 A * | 3/1990 | Arnseson | B63B 39/061 114/285 |
| 6,138,601 A | 10/2000 | Anderson | |
| 8,578,873 B2 | 11/2013 | Gasper | |
| 10,308,321 B1 * | 6/2019 | Miller | B63B 32/70 |
| 2009/0165694 A1 * | 7/2009 | Beamer | B63B 39/061 114/285 |
| 2014/0026799 A1 | 1/2014 | Kalil | |
| 2017/0038771 A1 | 2/2017 | Green | |

* cited by examiner

*Primary Examiner* — Stephen P Avila
(74) *Attorney, Agent, or Firm* — Allen Dyer Doppelt & Gilchrist, PA

(57) ABSTRACT

Flow modifiers are positioned at one or more discrete points along the underside of a boat hull to generate secondary wakes that interfere with the primary wake generated by the boat hull and result in a desired modified wake useful for various watersports. The flow modifiers are formed integrally with the boat hull or affixed thereto, and can be selectively extendable and retractable relative thereto.

16 Claims, 6 Drawing Sheets

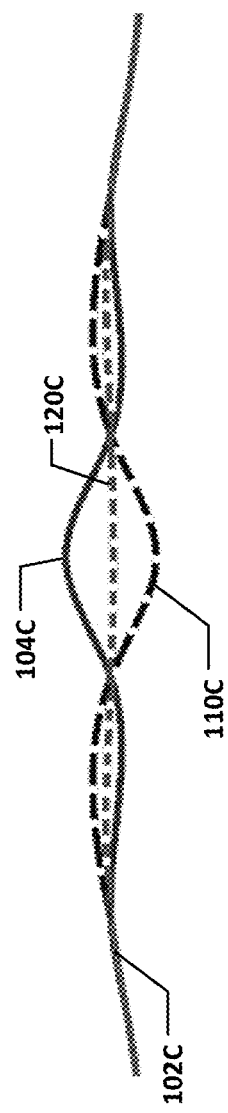
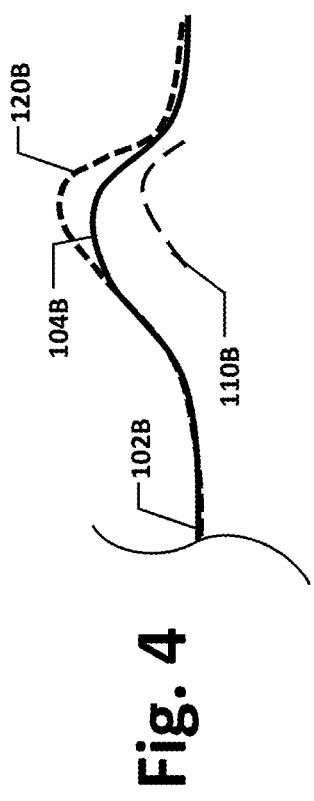
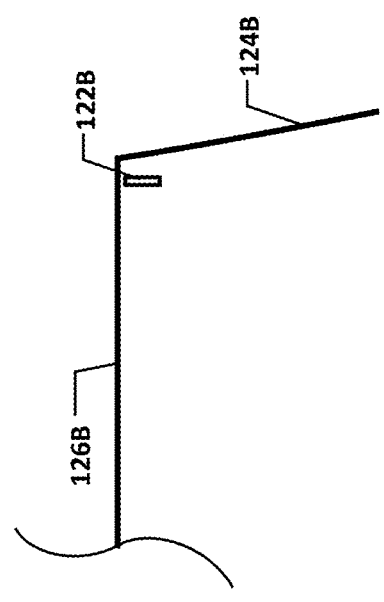

DEVICES AND METHODS FOR WAKE TUNING

CROSS-REFERENCE TO RELATED APPLICATION

This application is a continuation of U.S. Non-Provisional patent application Ser. No. 15/727,660, filed on Oct. 9, 2017, which claims the benefit of U.S. Provisional Patent Application Ser. No. 62/481,826, filed on Apr. 5, 2017, the contents of which applications are herein incorporated by reference in their entirety.

FIELD OF THE INVENTION

The present invention generally relates to boat hulls, and more particularly to device and methods for generating desired wake forms.

BACKGROUND OF THE INVENTION

A wake is generated as a boat travels through the water and extends aft of the boat. In various surface water sports, including various forms of waterskiing, wakeboarding, wakesurfing, etc., an athlete regularly interacts with a boat wake. A great deal of effort has gone into designing boats and boat hulls to achieve wake shapes that are more advantageous for particular watersports—particularly those water sports like wakeboarding and wakesurfing, where wake interaction is the primary object of the sport. However, despite significant advancements in this area, further improvements are possible.

SUMMARY OF THE INVENTION

In view of the foregoing, it is an object of the present invention to provide devices and methods for waking tuning. Embodiments of the present invention are directed to altering a wake shape by generating a secondary wake as water flows across a boat hull and detaches from the stern and/or sides thereof. A primary wake is caused by the flow of water around the underside of the boat hull and one or more secondary wakes interfere, constructively or destructively, with portions of the primary wake to generate the modified wake cross section. Via constructive interference, the secondary wake can be generated in phase with a primary wake portion to increase an effective height of the modified wake. Alternatively, utilizing destructive interference, the secondary wake can be generated out of phase with a primary wake portion to decrease an effective height of the modified wake.

In order to generate the secondary wake, one or more discrete flow modifiers extend below a wetted surface of the boat hull in a particular illustrative embodiment. The flow modifiers may be any desired shape to produce the desired secondary wake. For example, the flow modifiers may be wedge shaped or blade shaped. The flow modifiers may be generally aligned with the flow of water or generally perpendicular or angled to the flow of water along the boat hull, or any combination thereof. The flow modifiers are preferably proximate to an aft portion of the boat hull. The flow modifiers may be secured to a trailing edge of the boat hull, or along the sides of the boat hull, for example.

The flow modifiers may be integrally formed with, or otherwise permanently secured to, the boat hull. Alternately or additionally, the flow modifiers may be removably secured to and/or retractable out of the path of water flow; for example, by retraction into the boat hull or by folding or sliding into a flush position from a protruding position. Flow modifiers may be installed and removed and/or repositioned as needed. A particular numbers, shapes and sizes of the flow modifiers may be selected based on the modified wake cross section that is desired.

BRIEF DESCRIPTION OF THE DRAWINGS

Features and benefits of the present invention will become apparent as the description proceeds when taken in conjunction with the accompanying drawings and photos in which:

FIG. 4 is a partial elevational view of a wake cross section, showing wake tuning achieved by the present invention advantageous for wakeboarding;

FIG. 5 is a partial bottom plan view of a trailing edge of a boat hull having a flow modifier positioned for achieving the wake tuning of FIG. 4;

FIG. 6 is a elevational view of a wake cross section, showing another general type of wake tuning possible with the present invention;

DETAILED DESCRIPTION OF PREFERRED EMBODIMENTS

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and fully convey the scope of the invention to those skilled in the art. Like numbers refer to like elements throughout.

Figure 1:
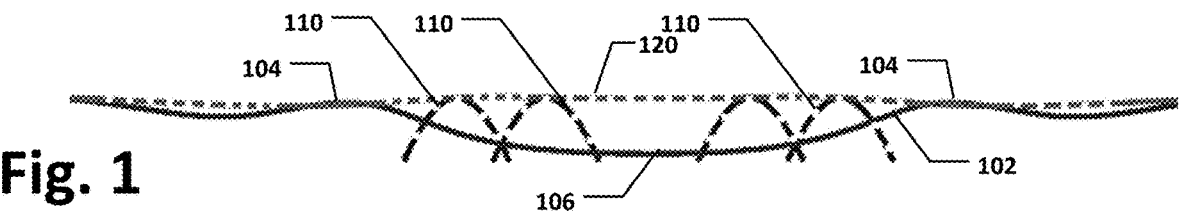
FIG. 1 is an elevational view of a wake cross section, showing wake tuning achieved by the present invention advantageous for slalom skiing.

Referring now to FIG. 1, a diagram of a typical primary wake cross section 102 (solid line) generated by a boat for a slalom skier is illustrated. The primary wake cross section 102 includes crests 104 with resulting trough 106 therebetween. A slalom skier would repeatedly cross the wake, and hence encounter disruption from the crests 104 and trough 106. It is consequently desirable to reduce the peak to peak amplitude of the crests 104 and trough 106 across the wake 102.

To accomplish this objective, a plurality of secondary wakes 110 (large dashed lines) can be generated to interfere with the primary wake 102. The secondary wakes 110 create peaks out of phase with the crests 104 of the primary wake 102, and in phase with the troughs 106. In the modified wake portion represented by the cross section 120 (small dashed lines) achieved thereby, the peak to peak amplitude of the crests 104 and troughs 106 are reduced, resulting in an effectively flatter skiing surface presented to the slalom skier as he or she crosses that portion of the modified wake 120.

Figure 2:
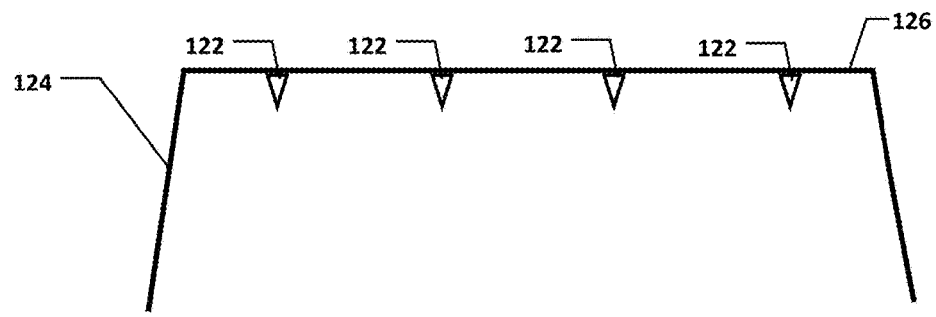
FIGS. 2 and 3 are bottom plan views of trailing edges of boat hulls having flow modifiers positioned for achieving the wake tuning of FIG. 1.
Figure 3:
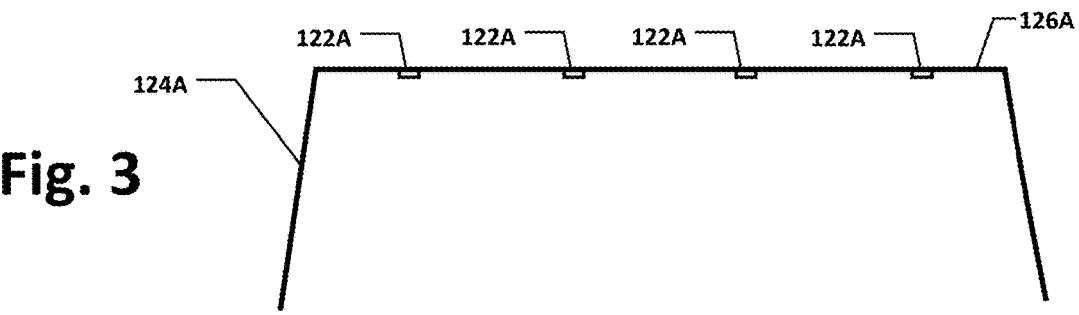

Referring to FIG. 2, the secondary wakes 110 are generated using flow modifiers 122 extending from the underside of a boat hull 124 proximate a trailing edge 126 thereof. In the FIG. 2 embodiment, the flow modifiers 122 are wedge shaped, although other shapes could be employed. For example, referring to FIG. 3, in an alternate embodiment, flow modifiers 122A are rectangular tabs. Other flow modifier shapes are also possible. Additionally, in the FIG. 2 embodiment, the flow modifiers 122 are located along the transom of the boat hull 124, although they could be located at other points depending on factors like the wake effect desired and modifier dimensions and shape.

The flow modifiers 122, 122A may be integrally formed with the hull 124, 124A, or permanently or releasably affixed thereto. For example, the flow modifiers could be permanently adhered to the hull or releasably attached thereto with threaded fasteners. In some embodiments, the flow modifiers could be selectively retractable and extendable from the hull, as desired, with corresponding controls within boat allowing an operator to micro-tune a modified wake form as desired.

In the FIG. 1 example, flow modifiers are used to effectively reduce crest to trough amplitude in a portion of the wake; however, flow modifiers could also be employed to selectively increase the amplitude of wake portions. For instance, when wakeboarding it may be desirable to increase the effective height of a portion of the wake, giving a wakeboarder a larger crest on which to ride. Referring now to FIG. 4, a portion of one half of a typical wakeboarding primary wake 102B is illustrated in cross section, having a prominent crest 104B along an outboard edge thereof. By creating a secondary wake 110B in phase with the existing crest 104B, a portion of a modified wake 120B is created having an amplified outboard crest.

In a particular illustrative embodiment shown in FIG. 5, a flow modifier 122B is disposed at an outboard edge of the trailing edge 126B of the boat hull 124B to create the secondary wake 110B. For economy of illustration, only one-half of the wake and boat hull are shown. It will be appreciated that a typical wake would be roughly mirrored about a centerline of the boat hull and flow modifiers 122B could be applied on both sides, as desired.

In FIG. 5, the flow modifier 122B is blade-shaped, but as described above, other diverter shapes and sizes could be employed. Similarly, the flow modifier 122B could be integrally formed with the hull 124B, or releasably or permanently affixed thereto. Likewise, the flow modifier 122B could be selectively extendable and retractable. Parameters like extension depth, angle of attack, etc. could be selectively adjustable to further fine tune a desired wake form.

In the preceding embodiments, secondary wakes 110, 110B with a positive amplitude were generated to increase the effective height of a corresponding trough 106 or crest 104B of the primary wake 102, 102B. Referring to FIG. 6, micro-tuning of a primary wake 102C could also be performed by creating one or more secondary wakes 110C having a negative amplitude. By aligning such a secondary wake 110C with a crest 104C of the primary wake 102C the crest 104C can be effectively eliminated in the modified wake 120C.

Figure 8:
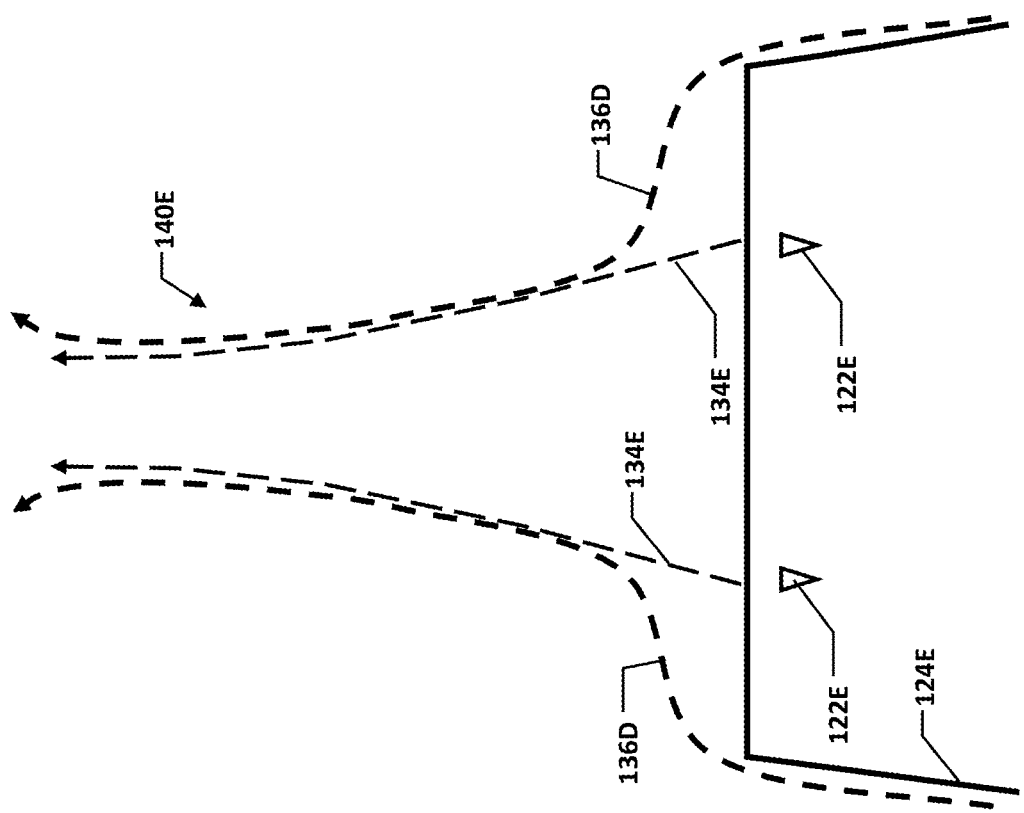
FIG. 8 is a bottom plan view of a trailing edge of boat hull having flow modifiers positioned for reducing the typical wake convergence of FIG. 7.
Figure 7:
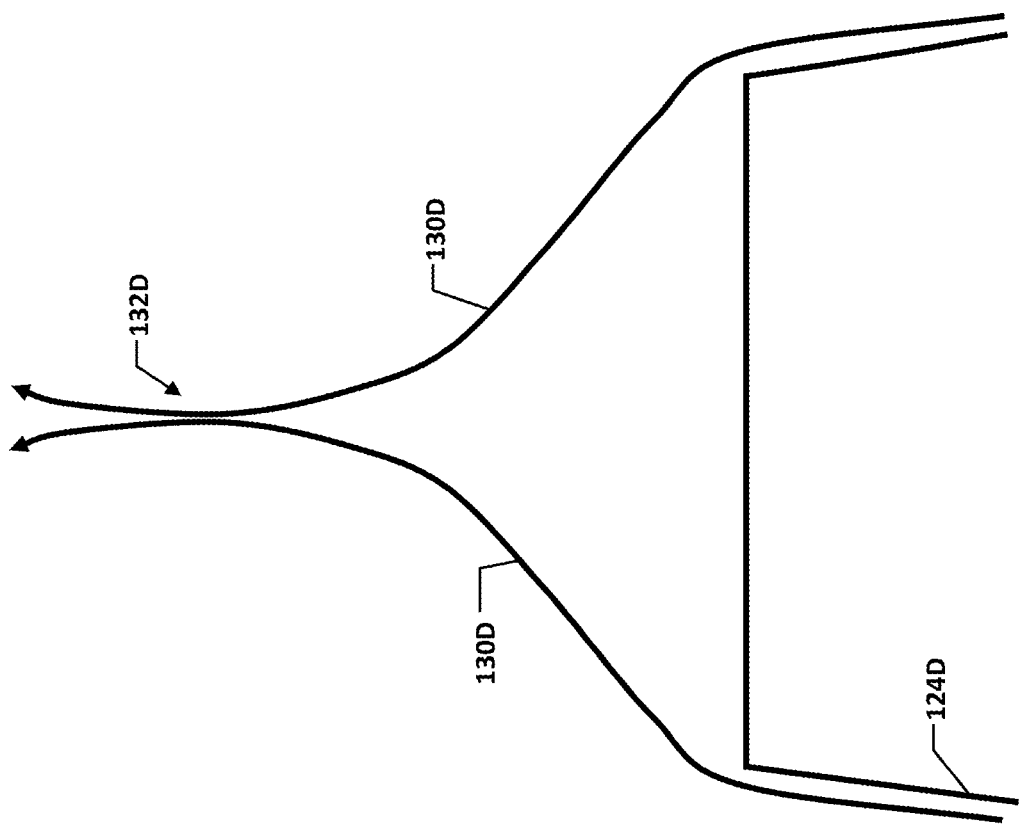
FIG. 7 is a bottom plan view of a trailing edge of boat hull illustrating a typical wake convergence.

The foregoing embodiments described wake micro-tuning accomplished primarily by adjusting the amplitude of sections of a primary wake 102, 102B, 102C via constructive or destructive interference with one or more secondary wakes 110, 110B, 110C. Referring to FIGS. 7 and 8, micro-tuning can be employed to adjust wake properties in other respects. In FIG. 7, an unmodified boat hull 124D creates converging wake lines 130D that, viewed from above, meet and create a highly turbulent convergence area 132D. Especially at high speeds, this convergence area 132D results in a large amount of spray or other wake disruption (e.g., "rooster tail") that can be disadvantageous for many types of water sports.

In FIG. 8, the boat hull 124E is equipped with flow modifiers 122E that create secondary wake lines 134E, which effectively drive apart the converging wake lines, creating modified wake lines 136E with less forceful convergence, reducing the disruption in a modified convergence zone 140E. In the depicted embodiment, the flow modifiers 122E are wedge-shaped, but as with the flow modifiers 122, 122A, and 122B, the shape, dimensions, method of integration or affixation to the hull, retractability, etc. can be varied within the scope of the present invention.

Figure 9:
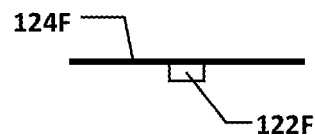
FIGS. 9-11 are each a partial end view of a portion of a boat hull with flow modifier extending thereunder.
Figure 10:
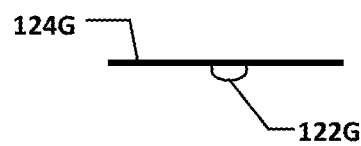
Figure 11:
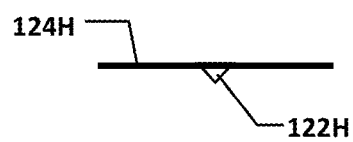
Figure 12:
FIG. 12 is a partial end view of a portion of a boat hull with a flow modifier formed extending thereinto.

The shapes of the flow modifiers 122, 122A, 122B and 122E are depicted from the bottom; FIGS. 9-11 show end views of flow modifiers 122F-H, further illustrating the potential variability of shape and configuration. Compound shapes and other more complex designs could also be employed. Additionally, where multiple flow modifiers are present on a given hull, it is not necessary that all be the same shape. It is also not necessary that a flow modifier extend downwardly from the hull. For example, referring to FIG. 12, the flow modifier 122I is formed as a recessed area extending upwardly into the hull 124I.

Figure 13:
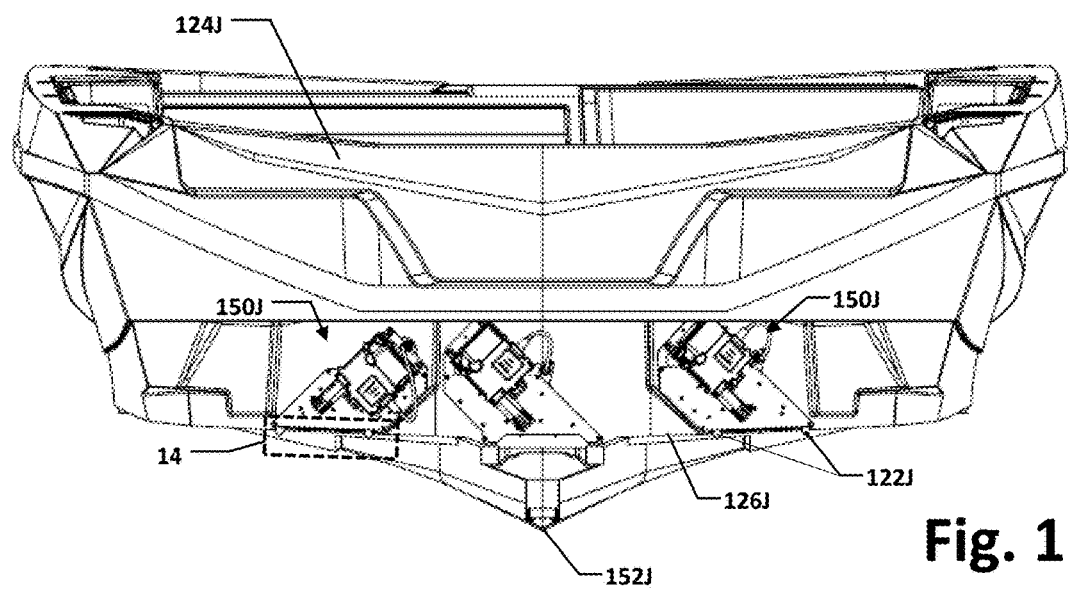
FIG. 13 is a rearview of watersports boat hull having flow extendable and retractable flow modifier assemblies.

As discussed above, flow modifiers can be affixed to a boat hull so as to be selectively extendable and retractable relative thereto. Referring to FIG. 13, according to a further embodiment of the present invention, a watersports boat hull 124J has a plurality of flow modifiers 122J located adjacent a trailing edge 126J thereof. In particular, the flow modifiers 122J are located in a pair of flow modifier assemblies 150J arranged symmetrically about the centerline 152J of the hull 124J.

Figure 14:
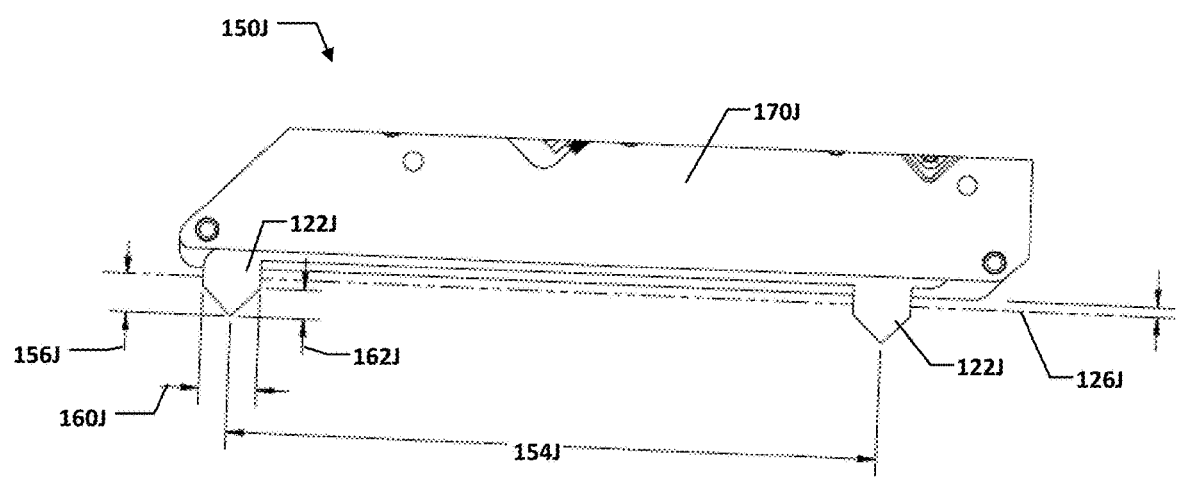
FIG. 14 is a detail view of area 14 of FIG. 14, with flow modifiers in a fully extended position.
Figure 15:
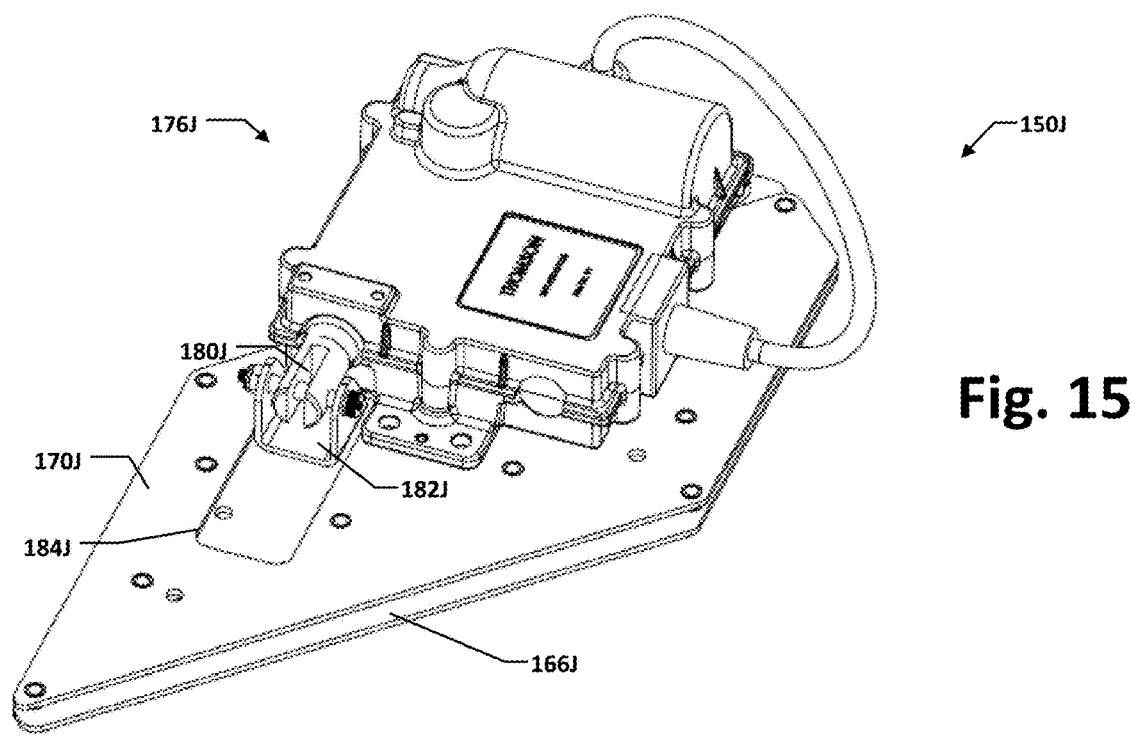
FIG. 15 is a perspective view of one of the flow modifier assemblies of FIG. 13, the flow modifiers thereof being in the fully retracted position.
Figure 16:
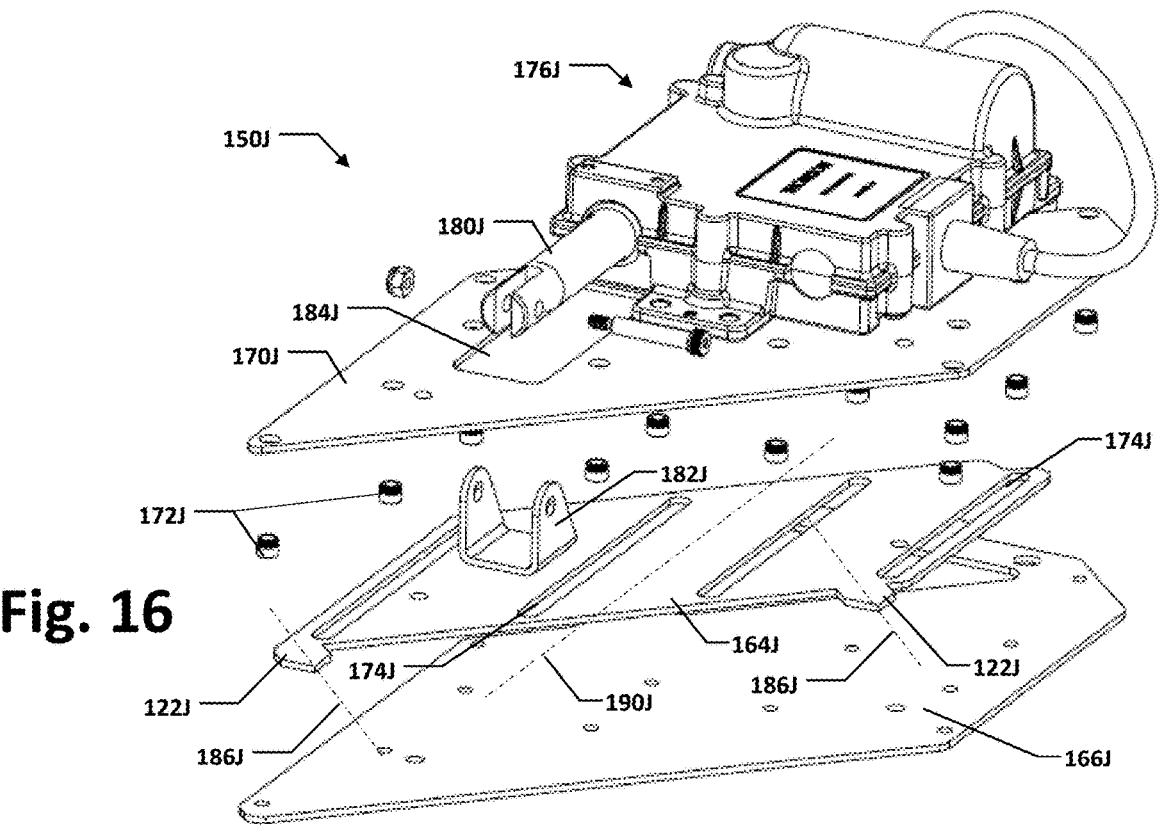
FIG. 16 is a partially exploded perspective view of the flow modifier assembly of FIG. 15.

Referring also to FIGS. 14-16, two flow modifiers 122J are commonly mounted in each assembly 150J and extendable (FIG. 14) and retractable (FIG. 15) together. In the depicted embodiment, the flow modifiers 122J in each assembly 150J are spaced apart by a distance 154J, preferably less than 2 inches and more preferably approximately 6 to 10 inches, inclusive. When fully extended, the flow modifiers 122J each extend a depth 156J below a level of the trailing edge 126J, preferably no more than 1-2 inches, and more preferably between ¼ to ¾ inch inclusive. The width 160J of each flow modifier 122J transverse to the centerline 152J is also preferably no more than 1-2 inches, and more preferably between ½ to 1 inch inclusive. The extended portion of each flow modifier 122J in the depicted embodiment transitions to a triangular shape from a rectangular shape for a final portion 162J of its depth.

The flow modifiers 122J are each formed as protrusions from a common plate 164J. The plate 164J is slidably mounted between a backing plate 166J affixed to the transom above the trailing edge 126J and face plate 170J. The backing and face plates 166J and 170J are held apart by spacers 172J which extend through guide slots 174J in the common plate 164J.

A linear actuator 176J is attached to the face plate 170J and engages the common plate 164J via an actuator shaft 180J. The actuator shaft 180J connects to a mounting bracket 182J on the common plate 164J which extends through a bracket opening 184J in the face plate 170J. Notably, the flow modifiers 122J extend from the common plate 164J along parallel modifier axes 186J which are angularly offset from a movement axis 190J of the common plate 164J.

Embodiments of the present invention allow the shape of the wake to be varied as desired by the various individuals such as wakeboarders, slalom skiers, jump skiers, wake surfers, trick skiers and others. By way of non-limiting example, for a slalom skier, a desirable secondary wake will generally be designed to achieve a shallow trough, small rooster tail, soft rooster tail, desired rooster tail position, low wake height, and a soft wake having a narrow crest. In another non-limiting example, generating a desirable secondary for the wakeboarder and will generally be designed to achieve a shallow trough, desired wake angle and lip shape, and a wake height desired for the range or tow rope length being used by the wakeboarder.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within.

What is claimed is:

1. A watersports boat comprising:
    a boat hull having an underside terminating at a trailing edge and generating a primary wake during movement through a body of water; and
    a plurality of flow modifiers located at, or adjacent to and forward of, the trailing edge, each of the plurality of flow modifiers being dimensioned to generate a respective secondary wake during movement through a body of water, the respective secondary wakes interfering with the primary wake to generate a modified wake;
    wherein at least two of the plurality of flow modifiers are located on each side of a longitudinal centerline of the boat hull.

2. The watersports boat of claim 1, wherein at least a portion of the plurality of flow modifiers are formed integrally with the boat hull and immovable with respect thereto.

3. The watersports boat of claim 2, wherein all of the plurality of flow modifiers are formed integrally with the boat hull.

4. The watersports boat of claim 1, wherein at least a first portion of the plurality of flow modifiers are affixed to the boat hull.

5. The watersports boat of claim 4, wherein the first portion of the plurality of flow modifiers are selectively extendable and retractable.

6. The watersports boat of claim 5, wherein the first portion of the plurality of flow modifiers includes the at least two of the plurality of flow modifiers located on each side of the longitudinal centerline of the boat hull.

7. The watersports boat of claim 6, wherein the at least two of the plurality of flow modifiers located on each side of the longitudinal centerline of the boat hull are commonly mounted so as to be selectively extendable and retractable together.

8. The watersports boat of claim 7, wherein the at least two of the plurality of flow modifiers located on each side of the longitudinal centerline of the boat hull are respective protrusions off a common plate, movement of the common plate effecting extension and retraction thereof.

9. The watersports boat of claim 1, wherein the at least two of the plurality of flow modifiers located on each side of the longitudinal centerline are mounted symmetrically thereabout.

10. The watersports boat of claim 1, wherein the at least two of the plurality of flow modifiers located on each side of the longitudinal centerline have a width transverse a longitudinal centerline of the boat hull no greater than two inches.

11. The watersports boat of claim 10, wherein the width of the at least two of the plurality of flow modifiers located on each side of the longitudinal centerline is no greater than one inch.

12. The watersports boat of claim 1, wherein the at least two of the plurality of flow modifiers located on each side of the longitudinal centerline extend no more than two inches below the trailing edge.

13. The watersports boat of claim 12, wherein the at least two of the plurality of flow modifiers located on each side of the longitudinal centerline extend no more than one inch below the trailing edge.

14. The watersports boat of claim 1, wherein at least a portion of the plurality of wake modifiers is dimensioned and positioned to interfere destructively with a respective portion of the primary wake during movement through a body of water.

15. The watersports boat of claim 1, wherein at least a portion of the plurality of wake modifiers is dimensioned and positioned to interfere constructively with a respective portion of the primary wake during movement through a body of water.

16. A method for tuning a primary wake generated by a boat hull, the method comprising:
    generating secondary wake lines using at least two flow modifiers located on the boat hull to drive apart converging wake lines of the primary wake, such that a modified convergence zone results having less forceful convergence than without using the at least two flow modifiers.

* * * * *